UNITED STATES PATENT OFFICE.

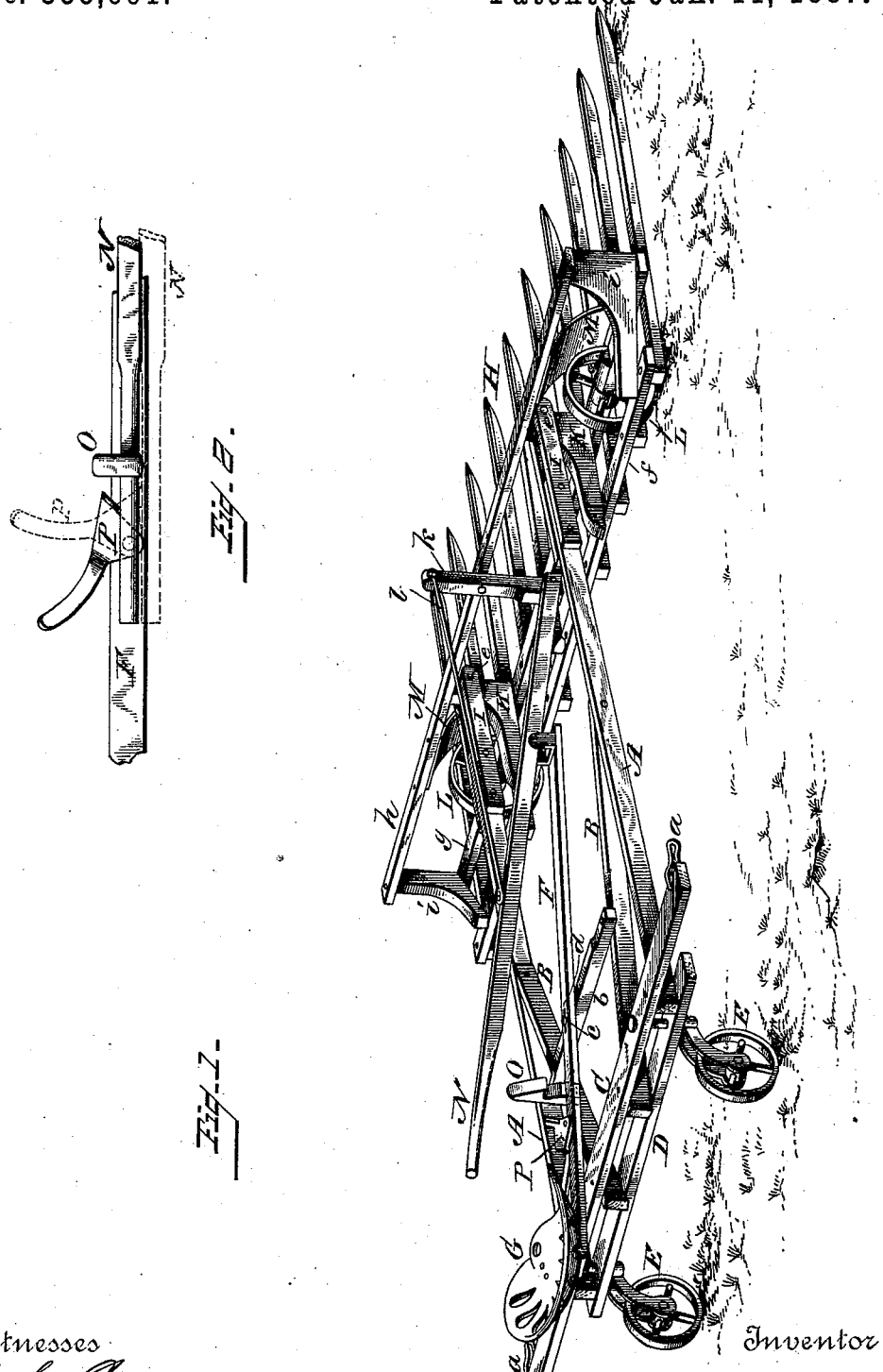

PETER F. FLEMING, OF HUNTSVILLE, MISSOURI.

HORSE HAY-RAKE.

SPECIFICATION forming part of Letters Patent No. 355,691, dated January 11, 1887.

Application filed May 1, 1886. Serial No. 200,839. (No model.)

*To all whom it may concern:*

Be it known that I, PETER F. FLEMING, a citizen of the United States, residing at Huntsville, in the county of Randolph and State of Missouri, have invented certain new and useful Improvements in Hay-Rakes; and I do hereby declare that the following is a full, clear, and exact description of the same, reference being had to the annexed drawings, making a part of this specification, and to the letters and figures of reference marked thereon.

Figure 1 of the drawings is a perspective view of my invention, and Fig. 2 a detail view of the lever, central beam, and latch and trip devices.

The present invention is designed as an improvement on my former patent for hay-rake, No. 259,839, dated June 20, 1882; and it consists in the several details of construction, substantially as shown in the drawings, and hereinafter described and claimed.

In the accompanying drawings, the rectangular frame of the machine consists of the side beams, A, angular braces B, and parallel end beams, C D, between which the rear ends of the side beams and braces are securely fastened. To the beams C D are suitably connected two caster-wheels, E, and the upper one of said beams has connected to its ends suitable draft-clevises, *a*.

To the upper side of the angular braces B is secured a transverse support, *b*, and to this support is connected, by a bolt, *c*, a central beam, F, the rear end of which is provided with a driver's seat, G, and the forward end suitably pivoted to the under side of a lever, N, said lever extending back within convenient reach of the driver. The bolt *c* passes through an elongated slot, *d*, in the beam F, to admit of its having a slight longitudinal movement when the lever N is operated, to enable said lever to be freely raised or lowered.

The frame of the machine is connected directly behind the rake H, instead of at the corners, as in my former patent, and as a means of attaining this end I provide the side beams, A, with bifurcated extremities I, which straddle brackets K, and are pivoted thereto at *e*, as shown. These brackets K are suitably attached to the transverse beams *f g*, which form together the rake-head, the forward one of said beams having mounted thereon the drive-wheels L for supporting the rake, said beam thus forming a stationary axle for the wheels.

Each wheel is provided with a fender, M, secured at their lower ends to the rake-teeth, and at their upper ends to a transverse bar, *h*, extending some distance above and over the rake and attached at its ends to brackets *i*, which in turn are secured to the beams *f g*.

The forward end of the lever N is rigidly secured to a short standard, *k*, which is fastened both to the transverse beam *g* and to the bar *h*, and connecting the standard with the lever is a brace-rod, *l*. When it is desired to elevate the forward end of the rake off the ground, the lever N is depressed and held in such position by engaging with a latch, O, and is released therefrom to bring the rake-teeth in operative position by a trip device, P. This trip device is pivoted to the central beam, F, directly in front of the seat G, and when pressed upon by the foot of the driver it forces out laterally from under the latch O the end of the lever N, disengaging it from the latch, and allowing the rake to fall to an operative position by gravity. The latch O is firmly secured to the central beam, F, and may be of any well-known form that will hold the lever depressed, as may also the trip device P.

The manner of attaching the frame of the machine to the rake-head by means of the bifurcated extremities of the side beams and the brackets renders the point of attachment much stronger and more durable and prevents any lateral strain on the beams.

The two caster-wheels at the rear end of the frame enable the machine to run much steadier and increases its strength, as do also the wheels of the rake, the fenders thereof preventing the hay from winding around the wheels and clogging them.

The operating-lever is materially strengthened by attaching it as shown—viz, by means of the standard *k* and brace-rod *l*—it being essential that the lever at the point of attachment to the rake should be strong and durable, as the constant lifting of the rake by the lever and the weight to be overcome renders it necessary that the lever should possess the necessary strength.

The seat, as will be seen, is attached to a central beam, instead of to the side beams of the frame of the machine, making a good comfortable seat for the driver, and at the same time his weight causes the point of the rake-teeth to hug the ground, thereby gathering the hay therefrom much cleaner. The seat being attached to the end of a central beam, and said beam in turn being connected to a transverse support, admits of the seat tilting with the driver's weight.

Having now fully described my invention, what I claim as new, and desire to secure by Letters Patent, is—

1. In a hay-rake, the combination, with a suitable draft-frame pivoted to the rake-head, of a central beam provided at one end with the driver's seat and at the opposite end carrying a pivoted rake-operating lever, the beam being connected to a transverse support upon the draft-frame by a bolt and elongated slot and the lever to the rake-head by a brace-rod and standard, substantially as and for the purpose specified.

2. In a hay-rake, a suitable frame and rake pivoted at its front end and mounted upon wheels, a standard secured to a transverse beam connected to the rake-head, in combination with an operating-lever secured to the standard and pivotally connected to a central seat-supporting beam, a latch device for holding the lever depressed, and a pivoted trip device for releasing the lever therefrom, substantially as and for the purpose set forth.

In testimony that I claim the above I have hereunto subscribed my name in the presence of two witnesses.

PETER F. FLEMING.

Witnesses:
C. A. FLEMING,
E. E. ELLINGTON.